United States Patent

[11] 3,573,398

[72] Inventor Thomas S. Kulka
200 Film Building, 2108 Payne Ave.,
Cleveland, Ohio 44114

[21] Appl. No. 702,074
[22] Filed Jan. 31, 1968
[45] Patented Apr. 6, 1971

[54] SOUND SUPPRESSION DEVICE FOR TELEPHONE
8 Claims, 14 Drawing Figs.

[52] U.S. Cl. .......... 179/146
[51] Int. Cl. .......... H04m 1/14
[50] Field of Search .......... 179/100 (D), 146, 147, 179, 100, 185, 1 (C), 1 (HSO); 179/180, 182, 187, 188

[56] References Cited

UNITED STATES PATENTS

| | | | |
|---|---|---|---|
| 2,458,199 | 1/1949 | Reinhold | 179/180 |
| 2,851,544 | 9/1958 | Wisdom | 179/188 |
| 2,484,450 | 10/1949 | Fisher | 179/147 |
| 2,546,229 | 3/1951 | McCloskey et al. | 179/185X |
| 2,639,334 | 5/1953 | Fleming | 179/146 |
| 2,669,610 | 2/1954 | Dent | 179/185 |

FOREIGN PATENTS

| | | | |
|---|---|---|---|
| 609,007 | 11/1960 | Canada | 179/185 |
| 856,751 | 11/1952 | Germany | 179/146 |

*Primary Examiner*—William C. Cooper
*Attorney*—Oberlin, Maky, Donnelly & Renner

ABSTRACT: Sound suppression devices for suppressing the pick up and transmission of voices or noises in the vicinity of the telephone handset when the same is in a position hung up on the telephone base. In all of the various illustrated forms of the invention, means formed on or associated with the handset and/or base absorb voices in the vicinity and inhibit the same from reaching the transmitter section of the handset, without, however, in any way detracting from the normal use of the telephone.

INVENTOR
THOMAS S. KULKA

BY
Oberlin, Maky, Donnelly & Renner
ATTORNEYS

INVENTOR
THOMAS S. KULKA

BY
Oberlin, Maky, Donnelly & Renner
ATTORNEYS

INVENTOR
THOMAS S. KULKA

BY
Oberlin, Maky, Donnelly & Renner
ATTORNEYS

SOUND SUPPRESSION DEVICE FOR TELEPHONE

BACKGROUND OF THE INVENTION

The present invention relates as indicated to a sound inhibiting device for telephones and more particularly to a device for inhibiting sound transmission when the telephone is placed in a rest or hung-up position.

The use of the telephone for unauthorized snooping has for some time been known and practiced, with wiretapping being perhaps the most well-known form of such snooping. In wiretapping, the phone conversation is electronically monitored, permitting the listener to pick up the voice of both parties to the call.

Recently, more sophisticated forms of snooping have become known wherein the telephone handset is modified internally so as to function as an open microphone. Such modifications are relatively simple and can be effected in several ways thereby permitting voices in the region of the handset to be picked up and transmitted while the handset is hung up. The ability of such a modified receiver to eavesdrop against unsuspected occupants of the room is almost limitless, with equipment of the type now available permitting even whispers as far away as 30 feet or more to be picked up and transmitted.

SUMMARY OF THE INVENTION

It is accordingly an object of the present invention to provide means associated with the handset or the telephone base for inhibiting the transmission of sound through the handset when the latter is at rest, in a hung-up position. In the various disclosed forms of the invention, sound barrier material is either carried by the handset or is adapted to be engaged by the handset when hung up thereby positively closing off the receiver to the pick up and transmission of sounds in the vicinity thereof.

A further object of the invention is to provide such a sound suppression device which can be simply and quickly installed on existing telephone base constructions or handsets without such equipment requiring modification.

A still further object of the invention is to provide a sound suppression device which in no way interferes with the normal and intended use of the telephone.

Yet another object is to provide a sound suppression device that is simple in construction and capable of manufacture at relatively low cost.

These and other objects and advantages of the present invention will become apparent as the following description proceeds.

DETAILED DESCRIPTION

Figure 1:
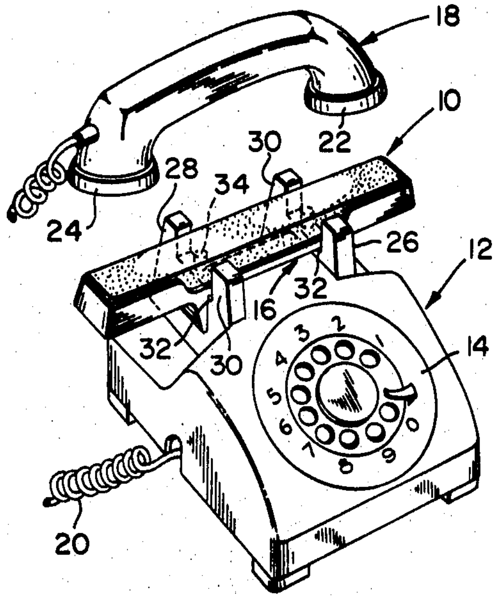
FIG. 1 is a perspective view of a conventional telephone base and handset, with the handset shown elevated and adapted when lowered to rest on a supplemental handset support constructed in accordance with the present invention.
Figure 2:
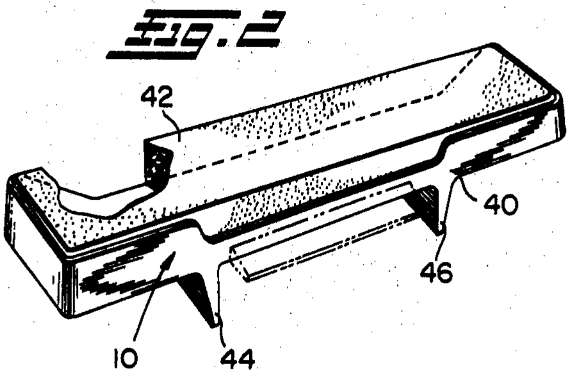
FIG. 2 is a perspective view of the supplemental handset support member itself.

Referring now in more detail to the drawings, wherein like parts are indicated by like reference numerals, and referring initially to the form of the invention illustrated in FIGS. 1 and 2, a supplemental handset support member is generally indicated at 10, with the specific configuration of such member being shown enlarged in FIG. 2. The support member 10 is specifically designed for use without modification of a telephone base generally indicated at 12, the construction of which is well-known. The base 12, which will be described only to the extent necessary to give a full understanding of the present invention, comprises the usual dial 14 and cradle region generally indicated at 16. A handset generally indicated at 18 is operatively attached to the base by a cord 20 in the usual manner. In FIG. 1, the handset cup section or ear piece of the receiver is indicated at 22 and the transmitter section or voice piece at 24.

The cradle section 16 includes cradle end sections 26 and 28 each of which includes upstanding projections commonly designated at 30. Each associated pair of such projections is spaced by shelflike connector sections commonly designated at 32 formed integrally with the remainder of the cradle section and which define with the adjoining projections 30 aligned recesses for receiving the handset 18. Each of the connector sections 32 is formed with an aperture through which extends a spring biased plunger 34 with the plungers adapted to be depressed when the handset 18 is hung up and to be lifted when the handset 18 is removed from the base, all in well-known manner.

As noted above, it has been discovered that by relatively simple modification, for example, by changing a wire or wires in the telephone circuit, the handset 18 can be converted into an open microphone capable of picking up and transmitting sound in the vicinity thereof even when the same has been hung up on the telephone base and the plungers depressed. In accordance with the present invention, the supplemental handset support member 10 is adapted to be positioned more or less permanently in the cradle section 16, functioning effectively to close off the transmitter and handset sections 24 and 22, respectively, when the receiver is positioned on the cradle.

As best shown in FIG. 2, the handset support member 10 comprises a bottom portion 40, and, in the form shown, a separate cushion section 42. The bottom section 40 and cushion 42 can be made of any satisfactory material or materials possessing the characteristics required. Specifically, the support member should be lightweight so as not to depress the plungers mounted in the cradle section of the telephone base when the handset 18 is lifted therefrom. Secondly, the cushion 42 must possess the desired sound absorbing quality so that when the handset 18 is placed thereon the openings in at least the transmitter section 24 of the handset are effectively covered by the cushion material 42 thereby inhibiting the pickup and transmission of sound in the vicinity of the telephone. The bottom section 40 could be formed of any suitable lightweight plastic, foamed or otherwise, for example, Styrofoam, or the like. The cushion 42 can likewise be formed of any material which serves effectively as a barrier to sound entering the transmitter section 24, with lightweight sponge rubber being satisfactory for such purpose.

The bottom 40 of the handset support member 10 is formed with spaced feet 44 and 46 which are spaced a distance slightly in excess of the distance from the outside surfaces of the projections 30 and connecting sections 32, with the feet serving to position the handset support member 10 generally symmetrically on the cradle. The length of the member 10, and particularly the cushion 42, is such as to receive the transmitter and receiver sections 24 and 22 of the receiver when the latter is placed thereon. In addition, the sponge rubber 10 will be of sufficient thickness and resiliency to cushion the transmitting and receiving sections when the handset is positioned thereon thereby significantly inhibiting voice transmission through the transmitter section. If desired, the cushion can be preformed to complement exactly the shape and angularity of the handset sections 22 and 24.

The manner in which the FIGS. 1—2 form of the invention is used should be apparent from the above. The support member 10 is positioned on the cradle 16 of a conventional telephone base 12 with the feet 44 and 46 spacing the same thereon. The combined weight of the base or bottom 40 of the member and the cushion 42 is such that the plungers extending through the connecting sections 32 of the cradle are resiliently biased to an open position when the handset 18 is picked up. In this manner, the device in no way interferes with the normal use of the telephone. The weight of the handset 18 when placed on the support member 10 is such as to depress the plungers and thus close the telephone line or lines when the receiver is hung up. In addition, in accordance with the invention, the conformation of the cushion material 42 to the curvature of the transmitter and receiver sections 24 and 22 of the handset 18 serves to inhibit the pickup and transmission of noise within the vicinity of the telephone through the transmitter section as might otherwise be possible if the handset were simply hung up.

It will be understood that although the support member in the FIGS. 1—2 form of the invention is of two-piece construction, a single piece could be molded or otherwise manufactured and the same result achieved. The material used in any one-piece construction will desirably fulfill the above-noted requirements of being both light in weight and of the type to conform closely to the shape of the transmitter and receiver sections of the handset and to absorb, rather than transmit, the sound in the vicinity of the handset when the same is placed thereon.

Figure 3:
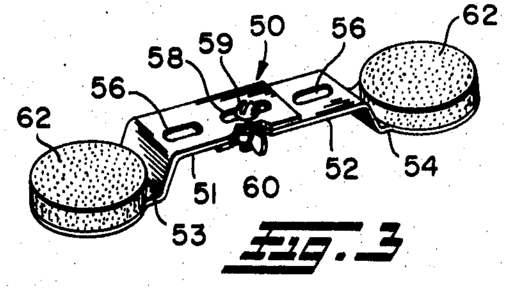
FIG. 3 is a perspective view of a modified form of sound prevention device which can be slipped over the cradle of a telephone base and which is provided with opposite end portions adapted to be engaged by the opposite ends of the handset.

Referring to FIG. 3, there is shown therein a modified form of the device constructed in accordance with the invention. In this form, the desired sound suppression is obtained through the use of an elongated strap assembly generally indicated at 50 which is adapted to fit over the cradle section 16 of the telephone base of the type illustrated in FIG. 1 and described above.

The strap assembly 50 includes individual strap members 51 and 52, each of which is formed with end portions 53 and 54. The strap members 51 and 52 are each formed with outer and inner elongated slots commonly designated at 56 and 58 with the inner slots 58 being vertically aligned to receive a bolt 59 and wing nut 60. In this manner, the end portions 53 and 54 can be longitudinally adjusted to accommodate handsets of various lengths, with the wing nut 60 being tightened to secure the adjustment. The slots 56 are for the purpose of variably accommodating the plungers in the cradle section, with the distance between plungers varying somewhat from model to model.

The end portions 53 and 54 are preferably of a diameter at least as large as the diameter of the transmitter and receiver sections 24 and 22, respectively of the handset 18 previously described and illustrated in FIG. 1 and have mounted thereon cushions or pads 62 which completely cover such sections when the telephone handset is placed on the base.

The strap assembly 50 can be made of any suitable material having the characteristics mentioned above with respect to the FIGS. 1—2 form of the invention. Thus, the strap may be metallic, for example, aluminum, and the pads 62 sponge rubber. It will also be understood that the strap assembly may be of one-piece construction, formed, for example, of a fairly stiff, yet resilient composition, for example, dense sponge rubber or the like. In such case, the circular end portions 53 and 54 would generally conform to the curvature of the receiver and transmitter sections 22 and 24 of the handset when the same is placed thereon to provide a barrier to the passage of sound in the vicinity of the telephone to the transmitting section 24.

As a still further alternative, the strap 50 may comprise a molded product having a lightweight metal center or core made from, for example, lightweight aluminum or the like, surrounded by sponge rubber or the like as described. In such alternative form, the strap 50, and more particularly the generally circular end portions 53 and 54 thereof, could be bent so as to depend angularly from the central section thereof in a plane parallel with the planes of the receiver and transmitter sections 22 and 24 of the receiver 18 when the same is positioned on the strap 50.

Figure 4:
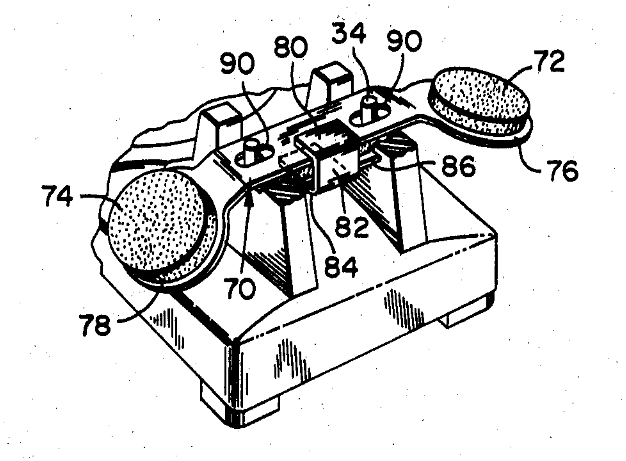
FIG. 4 is a perspective fragmentary view of the rear of a telephone base, with a still further form of the invention being supported thereby in the cradle region thereof.

There is shown in FIG. 4 a still further modified form of the invention. In this form, the desired sound suppression is accomplished by a device comprising a bracket generally indicated at 70 similar to the strap 50 just described, and having a pair of generally circular sponge rubber or the like pads 72 and 74. These pads are adhesively or otherwise mounted on the correspondingly shaped end sections 76 and 78, respectively, of the bracket 70. The bracket 70 carries a mounting clamp 80 generally C-shaped in cross section and including a vertical leg 82 and an inwardly directed vertically spaced bottom leg 84. The latter is spaced from the center section of the bracket so as to receive the web section 86 of the cradle when the device is mounted.

The central section of the bracket 70 is formed with openings commonly designated at 90 for receiving the plungers 34 with the openings serving at the same time to properly position the bracket on the cradle section. The lightweight aluminum from which the bracket 70 is preferably made can be sufficiently thin so that the end sections 76 and 78 carrying the pads 72 and 74, respectively, are downwardly flexed about their juncture with the center section when the handset is placed thereon whereby the transmitter and receiver sections conform to the pads so as to suppress sound transmission. Alternatively, the circular end sections 76 and 78, if formed of a thick, nonresilient material such as, for example, hard rubber or plastic, may be downwardly bent at the time the device is manufactured or installed to the proper angle for receiving the receiver and transmitter sections of the receiver in face-to-face contact.

The installation of the FIG. 4 form of the invention should be apparent from the above. The device is generally aligned with the cradle by means of the noted apertures 90 and the lower leg 84 inserted beneath the web 86 of the cradle section. The entire device is then moved toward the edge of said web 86 until the vertical connecting section 82 contacts such edge, at which time the center section 80 is accurately positioned in the cradle section and the device ready for use. The manner in which the device functions to inhibit sound transmission when the receiver is hung up is as above described. It is again noted that the installation of the bracket 70 in no way interferes with the normal use of the telephone, with the handset 18 in this instance directly depressing the plungers.

Figure 5:
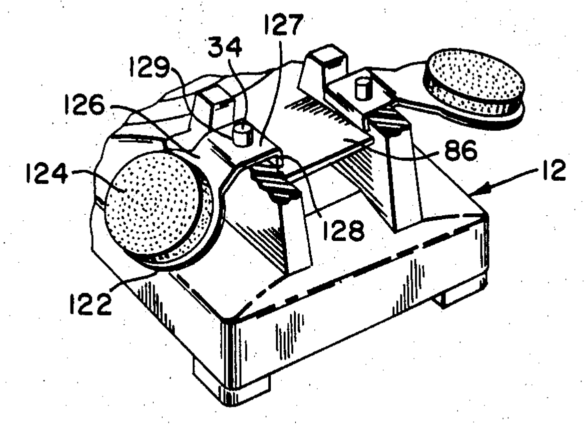
FIG. 5 is a perspective fragmentary view of the rear of a telephone base showing a still further form of the invention.

The FIG. 5 form of the invention is essentially an abbreviated form of the FIG. 3 device described above. In the FIG. 5 form, the device is designed for association only with the transmitter section 24 or handset section 22 of the receiver and comprises a bracket generally indicated at 120 which has a generally circular exposed end portion 122 which carries a sponge rubber or the like pad 124. The bracket 120 further includes a connecting section 126, a flat top section 127, and a vertical hooklike end section 128 generally parallel to the section 126. The top section 127 is formed with a opening 129 to receive the associated plunger 34.

The installation of the form of the invention should be apparent from the above description. If desired, and as shown in FIG. 5, two such device 120 can be simultaneously mounted on the telephone base.

Figure 6:
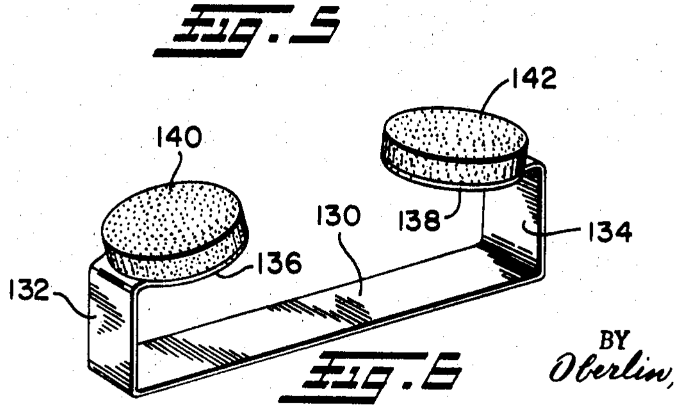
FIG. 6 is a perspective view of another form of the invention.

There is shown in FIG. 6 a still further form of the invention. In this form, a relatively elongated piece of lightweight metal such as aluminum or the like is bent so as to form a base section 130, opposite upwardly extending connecting sections 132 and 134, and inwardly directed end portions 136 and 138 preferably generally circular in configuration. The material employed is sufficiently pliable to permit flexing of the end sections 136 and 138 when the device is installed. A pair of sponge rubber or the like pads 140 and 142 are carried on the end portions 136 and 138, respectively, to provide the desired sound absorption characteristics.

To install the device illustrated in FIG. 6, the end portions 136 and 138 are flexed outwardly thereby permitting the base 130 and vertical connecting sections 132 and 134 to be disposed over and assume engagement with the contiguous bottom and adjoining end sections of the telephone base, with the length of the base 130 and the height of the adjoining vertically extending sections 132 and 134 being governed by the corresponding dimensions of the telephone base. In this regard, such dimensions will understandably vary significantly when the device is to be used with a regular telephone base or, for example, with a princess style base which is becoming increasingly popular.

When the device is so disposed over the telephone base, the end portions 136 and 138 will be directed inwardly at an angle so as to receive in face-to-face contact the transmitter and handset sections of the receiver 18, without in any way affecting the normal use of the telephone.

Figure 7:
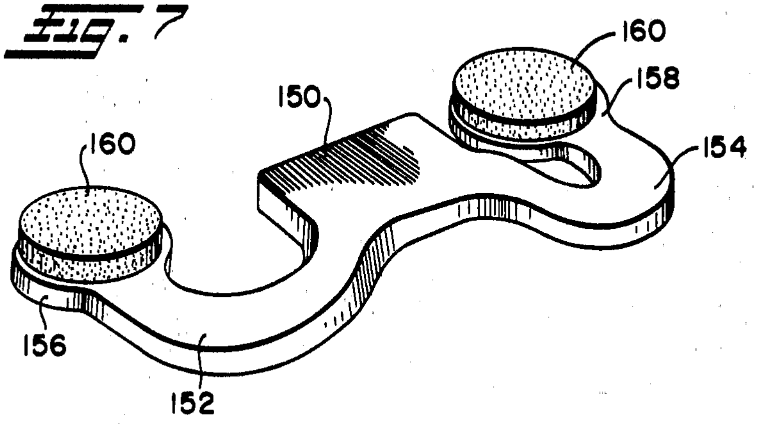
FIG. 7 is a perspective view of yet a further form of the invention.

There is illustrated in FIG. 7 a further form of the invention, somewhat similar in mode of installation to the FIG. 4 form above described. In the FIG. 7 form, a central section 150 is designed for installation in the base of the telephone just below the rib 86, FIG. 4, with curved arm portions 152 and 154 extending away from the central section and terminating in generally circular end portions 156 and 158, respectively. The latter are adapted to receive pads or cushions 160 which receive the handset and transmitter sections of the receiver. The FIG. 7 device can be integrally formed of a material, for example, hard rubber or hard plastic having the desired characteristics, or can be made primarily from such material, with sponge rubber or the like pads 160 adhesively or otherwise secured thereto.

It will thus be seen that the various forms illustrated in FIGS. 1—7 and above described are commonly characterized as being extremely simple in construction and thus economical to manufacture. In each instance, the device can be simply and quickly installed with existing telephone base equipment and without modification thereof so as to inhibit the pickup and transmission of noise through the transmitter section of the handset when the latter is in an hung up position. Thus, the occupant or occupants of the room can be assured that their discussion is not being monitored when the telephone is not in use.

It may in certain instances be desirable to provide the sound prevention material associated with the handset rather than with the telephone base as above described. This is particularly desirable where the receiver is associated with equipment found in environments other than the home or office. For example, certain new styles of pay telephones simply provide for suspending the handset from a hook, with the base as such in this instance merely comprising a vertical wall provided with coin slots and having mounted therein the telephone dial. In such arrangements, the provision of a sound absorbing device or material with the base presents obvious installation as well as esthetic difficulties.

Figure 8:
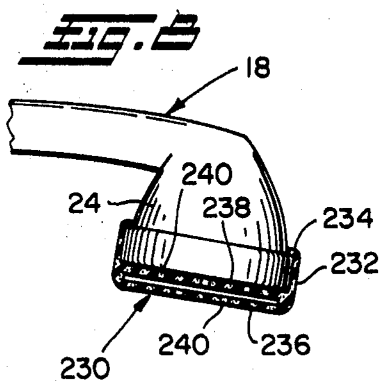
FIGS. 8—11 are fragmentary elevational views of a handset having mounted thereon still further forms of sound prevention devices constructed in accordance with the invention.

There is illustrated in FIG. 8 a form of receiver cap, generally indicated at 230. In this form, which is generally similar to the form shown at the left of FIG. 8, the cap includes an annular outer wall 232, upper lip 234, and spaced circular walls 236 and 238 which are in the form shown integrally formed with annular sidewall 232. Each of the walls 236 and 238 is formed with a plurality of openings commonly designated at 240, with the openings formed in the inner wall 238 being disaligned from the openings formed in the outer wall 236. In this manner, the openings 240 formed in the inner wall 238 are effectively closed by the outer wall 236 when the handset is hung up thereby avoiding voice transmission from the adjoining area. The cap 230 is similarly made of sponge or soft rubber, or equivalent sound material, which is resiliently compressed when the handset is hung up as above described.

Figure 9:
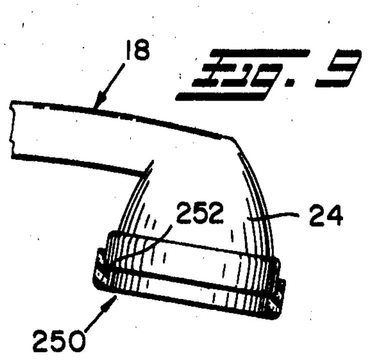

The FIG. 9 form of the invention comprises a ring 250 of sound absorbing material shaped to be tightly received and frictionally retained on the transmitter section 24 of the telephone handset. The ring 250 is provided with an annular shoulder 252 to center the device in place. In this form, the ring 250 is adapted when the handset is hung up to engage a suitably flat surface to effectively close off the area inwardly of the ring immediately outwardly or below the transmitter openings. Again, such flat surface may be provided by the telephone equipment itself or by supplementary or auxiliary base attachments of the type above described. In either event, the ring 250 is formed of a material to provide the desired results.

Figure 10:
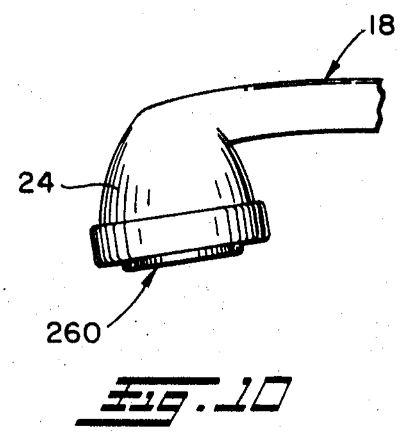

In the FIG. 10 form of the invention, a ring generally indicated at 260 is provided for suitable attachment such as by adhesive or the like to the end face of the transmitter section 24 of the handset so as to circumscribe the transmitting openings. In this manner, when the handset 18 is hung up, the engagement of the ring 260 with the surface supporting the handset effectively shuts off the area inwardly of the ring 260 and below the transmitter openings thereby suppressing voice transmission therethrough.

Figure 11:
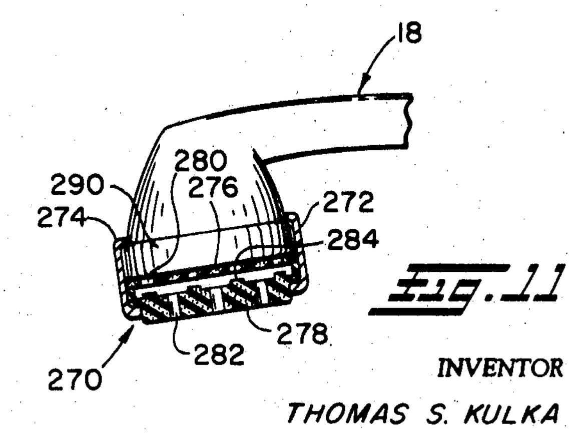

There is shown in FIG. 11 a still further form of handset cap, generally indicated at 270. The cap 270 comprises an outer annular wall having a lip 274 at the free end thereof for frictional retention on the handset cap 290, and inner and outer circular discs 276 and 278, respectively, one or both of which may be formed integral with the annular wall 272. The inner disc 276 is formed with a plurality of openings 280, and the outer, resilient disc 278 is formed with a plurality of nonaligned openings 282.

When the handset is in normal use, the discs 276 and 278 are spaced owing to the resilient nature of the outer disc 278 whereby sounds are transmitted through the openings 282, the space between the discs 276 and 278, and the openings 280 into the transmitter openings of the handset. However, when the handset is hung up, the surface against which the cap 270 engages compresses the disc 278 inwardly so that the protuberances commonly indicated at 284 formed on the inner surface of the disc 278 engage or overlap the openings 280 formed in the disc 276 thereby effectively closing such openings and inhibiting sound transmission to the openings of the transmitter section of the handset.

If desired, the outer disc 278 can be formed completely separate from the cap and resiliently biased by means of an annular spring or the like outwardly into the position shown in FIG. 11, with such disc being forced toward disc 276, against the bias of such spring, when the handset is hung up. Similarly, the entire handset cap 290, which is conventionally internally threaded for attachment or detachment from the receiver, could be formed as shown in FIG. 11 for replacement of the conventional transmitter section cap provided with the handset.

Figure 12:
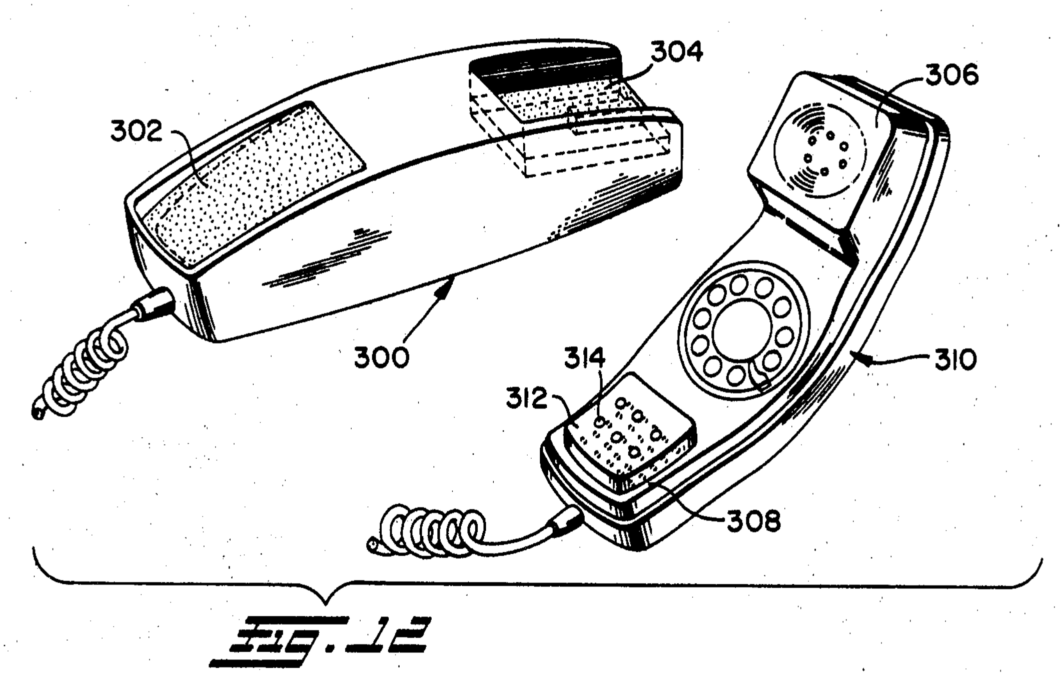
FIG. 12 is a perspective view of relatively new handset and base equipment, having associated therewith sound prevention means in accordance with the present invention.
Figure 13:
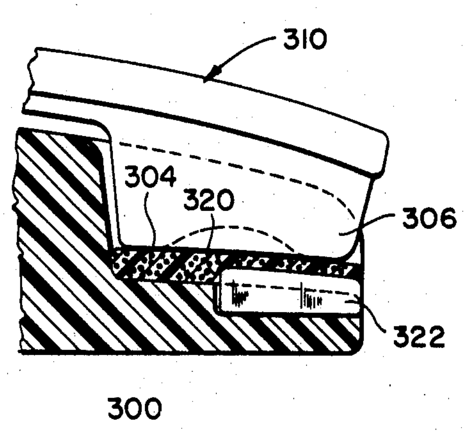
FIG. 13 is a sectional view of the right end portion of the base of FIG. 12, showing clearly the interrelation of the sound absorbing pad and the operating plunger of the base.

There is shown in FIGS. 12 and 13 a relatively recent telephone generally referred to as the Dial-in-handset model. In such equipment, in which the problem of potential use as an open microphone is similarly posed, the above described equipment is not altogether satisfactory. In the FIG. 12 form, the base generally indicated at 300 is adapted to receive pads 302 and 304 of sound absorbing material adapted to underlie the receiving and transmitting sections 306 and 308, respectively, of the receiver generally indicated at 310. The transmitting section 308 is also provided with a pad or cushion 312 constructed preferably of a relatively porous material such as sponge rubber or the like. The pad 312 is formed with openings 314 which function to transmit sound to the transmitter section when the handset is in normal use.

When the handset 310 is placed on the base 300 after use, the pad 302 attached to the base effectively closes the openings 314 formed in the pad or cushion 312 thereby preventing voice transmission. In addition, the weight of the handset 310 will compress to some degree the cushion 312 thereby effectively reducing the porosity characteristics of the cushion thereby enhancing the sound prevention characteristics of the same. It will be understood that the cushion 312 could be used with satisfactory results without the cushion 302 being attached to the base 300, with the latter serving to augment the noise transmission features of the arrangement.

Referring to FIG. 13, it will be noted that the pad 304 mounted on the base 300 is formed with a recess 320 adapted to receive the plunger 322. The plunger is resiliently mounted in the usual manner in the telephone base 300 by springs (not shown) which raise the plunger when the handset 310 is lifted to open the line. The spring force is such as to lift the pad 304 when the handset 310 is lifted whereby the pad in no way interferes with the normal use of the phone, with the pad and plunger being depressed when the handset is hung up to effectively seal the adjacent end of the receiver. It will be understood that if the plunger 322 was positioned in the base beneath pad 302, the latter would similarly be recessed to receive the same.

Figure 14:
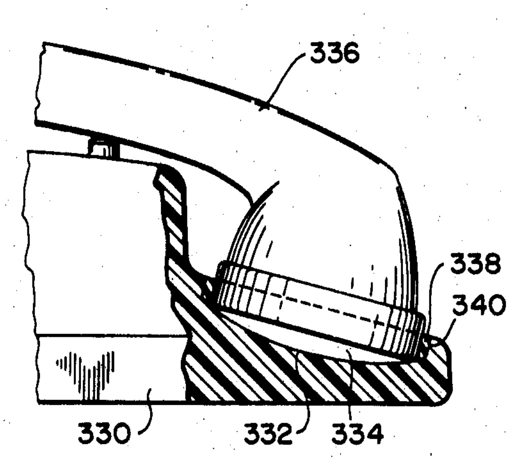
FIG. 14 is a sectional view through a portion of a telephone base, modified in accordance with the present invention to receive in sealed relation the telephone handset.

Referring to the form of the invention illustrated in FIG. 14, the telephone base 330 is formed with a dishlike concavity 322 generally complementing the adjacent face 334 of the handset 336. Although this continuous surface contact may in and of itself seal the adjacent handset end when the handset is hung up, an annular sealing ring 338 of sound absorbent material is preferably mounted within the outer, annular flat walled region 340 of the concavity 332. The inner diameter of the sealing ring is dimensioned slightly less than the outer diameter of the adjacent end of the handset whereby the ring is slightly deformed or compressed when the handset is hung up thereby serving to further seal the handset and suppress pickup and transmission of voices in the vicinity thereof.

It will be understood that the opposite end of the telephone base 330 can be similarly shaped and formed to carry a sealing ring 338 to seal off the handset at such opposite end. It will be apparent that the sound absorbent ring 338 could be carried by the handset 336 rather than by the base with equally satisfactory results.

It will be apparent that the particular details herein set forth may be modified or varied without departing from the principles of the invention, and that the scope of the invention should be limited only by the scope of the claims appended hereto.

I claim:

1. A device for suppressing voice transmission through the transmitter section of a telephone handset without interfering with the normal use of the handset, comprising separate handset support means, means for mounting said support means on a telephone base so as to position a portion of such support means in spaced relation from the base and in alignment with the adjoining end face of at least said transmitter section of said handset when said handset is moved toward said base to place the same in a normal hung up position, that portion of said support means engageable with said transmitter section of said handset being of a size to fully circumscribe the openings in such transmitter section and being provided with sound barrier means engaging said face of said transmitter section of said handset when the latter is placed on said support means thereby inhibiting voice transmission through said handset when the same is in a nonuse, hung up position.

2. The device of claim 1 wherein said support means comprises a strap assembly cradled in said telephone base, said strap assembly including strap members having opposed end portions in alignment with the opposite ends of said handset for receiving the same when said handset is hung up, said opposed ends including sound barrier means for suppressing voice transmission to said handset when the same is positioned on said strap, and means for longitudinally adjusting said strap members for accommodating receivers of varying length.

3. The device of claim 2 wherein pads of sound absorbing material are mounted on said opposed ends of said strap.

4. The device of claim 2 further including bracket means attached to said strap generally midway of the ends thereof, said bracket means operatively engaging said telephone base so as to hold said strap in adjusted position.

5. The device of claim 1 wherein said support means comprises a bracket adapted to be suspended over one side of the cradle of said telephone base, said bracket being formed with an opening to receive an adjacent telephone plunger resiliently mounted in said base, the outer end of said strap having mounted thereon a pad of sound absorbing material engaged by the transmitter section of said handset when the latter is hung up, thereby inhibiting voice transmission through said transmitter section.

6. The device of claim 1 wherein said support means comprises a generally U-shaped strap the base of which is adapted to be disposed below said telephone base, said strap including upwardly directed arm portions terminating in laterally inwardly directed ends spaced so as to be in alignment with the opposite ends of said handset when the latter is hung up, said ends of said strap carrying pads of resilient, sound absorbing material which receive said opposite ends of said handset when hung up thereby to suppress voice transmission through said handset.

7. The device of claim 1 wherein said support means comprises an elongated, imperforate support member having a central portion adapted to be inserted into an aperture located at the rear side of the telephone base, said member further including armlike end portions aligned when said member is mounted with the opposite ends of said handset, said end portions having pads of sound absorbing material mounted thereon engageable by said opposite ends of said handset when the latter is hung up thereby suppressing voice transmission through said handset when the same is in a hung up position.

8. A device for suppressing voice transmission through the transmitter and receiver sections of a telephone handset without interfering with the normal use of the handset, comprising strap means adapted to be received in the top cradle section of a telephone base, said strap means being formed with openings for receiving resiliently biased switching plungers mounted in said cradle section, the opposed ends of said strap means being inclined downwardly in planes parallel to the end faces of said transmitter and receiver sections, and pads of sound absorptive material provided on said opposed ends of said strap means, said pads being greater in dimension than the usual openings formed in the end faces of said transmitter and receiver sections thereby to cover the same when such sections engage said pads when said handset is moved to a hung-up position, said pads thereby suppressing voice transmission through said handset when the latter is not in use.